US012561142B2

(12) United States Patent
Giovannini et al.

(10) Patent No.: US 12,561,142 B2
(45) Date of Patent: Feb. 24, 2026

(54) METHOD AND SYSTEM FOR PREVENTING PREFETCHING A NEXT INSTRUCTION LINE BASED ON A COMPARISON OF INSTRUCTIONS OF A CURRENT INSTRUCTION LINE WITH A BRANCH INSTRUCTION

(71) Applicant: STMicroelectronics (Grenoble 2) SAS, Grenoble (FR)

(72) Inventors: Michael Giovannini, Grenoble (FR); Gerald Briat, Grenoble (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 264 days.

(21) Appl. No.: 16/922,095

(22) Filed: Jul. 7, 2020

(65) Prior Publication Data

US 2021/0011727 A1 Jan. 14, 2021

(30) Foreign Application Priority Data

Jul. 12, 2019 (FR) ...................................... 1907851

(51) Int. Cl.
*G06F 9/38* (2018.01)
*G06F 9/30* (2018.01)
(Continued)

(52) U.S. Cl.
CPC ........ *G06F 9/3804* (2013.01); *G06F 9/30021* (2013.01); *G06F 9/30043* (2013.01); *G06F 9/3802* (2013.01); *G06F 9/4498* (2018.02)

(58) Field of Classification Search
CPC .... G06F 9/3804; G06F 9/3802; G06F 9/4498; G06F 9/30021; G06F 9/30043; G06F 9/3814; G06F 12/0862

(Continued)

(56) References Cited

U.S. PATENT DOCUMENTS 5,664,135 A * 9/1997 Schlansker ......... G06F 9/30058
712/201
5,752,259 A 5/1998 Tran
(Continued)

FOREIGN PATENT DOCUMENTS

CN 1300006 A 6/2001
EP 1204022 A1 5/2002

OTHER PUBLICATIONS

MicrosoftComputerBusDefinition.*

*Primary Examiner* — Shawn Doman
(74) *Attorney, Agent, or Firm* — Slater Matsil, LLP

(57) ABSTRACT

In an embodiment a method for operating an integrated circuit includes sequentially requesting, by a processor of an integrated circuit, different instruction lines; determining, by a first comparator of the integrated circuit, while the processor processes a current instruction line supplied in response to a corresponding request, whether or not at least one of the instructions of the current instruction line is a branch instruction by comparing the at least one of the instructions to reference instructions; executing, by the processor, all instructions of the current instruction line before executing a next instruction line when the at least one instruction is a branch instruction from a program memory of the integrated circuit; and executing, by the processor, all instruction of the current instruction line before executing a next instruction line from first and second volatile memory of the integrated circuit when the at least one instruction is not a branch instruction.

20 Claims, 2 Drawing Sheets

(51) Int. Cl.
    G06F 9/448           (2018.01)
    G06F 12/0862       (2016.01)

(58) Field of Classification Search
    USPC ........................................................ 712/207
    See application file for complete search history.

(56)                References Cited

U.S. PATENT DOCUMENTS

| | | | | |
|---|---|---|---|---|
| 5,790,843 | A * | 8/1998 | Borkenhagen ............ | G06F 8/66 |
| | | | | 712/226 |
| 5,809,529 | A | 9/1998 | Mayfield | |
| 6,539,502 | B1 * | 3/2003 | Davidson ............ | G06F 11/3466 |
| | | | | 712/227 |
| 6,658,534 | B1 * | 12/2003 | White ................... | G06F 9/3804 |
| | | | | 711/137 |
| 7,441,110 | B1 | 10/2008 | Puzak et al. | |
| 8,176,297 | B2 * | 5/2012 | Yamamoto ............ | G06F 9/3802 |
| | | | | 712/205 |
| 2001/0054137 | A1 | 12/2001 | Eickemeyer et al. | |
| 2005/0257034 | A1 * | 11/2005 | Caprioli ................. | G06F 9/382 |
| | | | | 712/237 |
| 2009/0217003 | A1 * | 8/2009 | Sonnelitter, III ..... | G06F 9/3804 |
| | | | | 712/205 |
| 2013/0262828 | A1 * | 10/2013 | Yoneda ..................... | G06F 1/32 |
| | | | | 712/208 |
| 2014/0143521 | A1 * | 5/2014 | Doing ................ | G06F 9/30181 |
| | | | | 712/205 |
| 2014/0208039 | A1 | 7/2014 | Gilbert | |
| 2018/0130556 | A1 * | 5/2018 | Dobai ................... | G06Q 10/10 |
| 2018/0373978 | A1 * | 12/2018 | Yu ........................... | G06N 3/10 |
| 2019/0114263 | A1 | 4/2019 | Olorode et al. | |

* cited by examiner

METHOD AND SYSTEM FOR PREVENTING PREFETCHING A NEXT INSTRUCTION LINE BASED ON A COMPARISON OF INSTRUCTIONS OF A CURRENT INSTRUCTION LINE WITH A BRANCH INSTRUCTION

CROSS-REFERENCE TO RELATED APPLICATIONS

This application claims priority to French Patent Application No. 1907851, filed on Jul. 12, 2019, which application is hereby incorporated herein by reference.

TECHNICAL FIELD

The invention relates to integrated circuits, and more particularly to integrated circuits forming systems on chips (SoC).

BACKGROUND

A system on chip may comprise a non-volatile memory containing, for example, instruction lines to be executed by a processing unit of the system on chip.

The processing unit executes instructions contained in a first instruction line identified by a first address in the non-volatile memory.

The processing unit is connected to the non-volatile memory by a bus.

On completion of the execution of the first instruction line, the processing unit sends a request containing a second address of a second instruction line in the non-volatile memory.

Since the processing unit directly accesses the second instruction line in the non-volatile memory, the processing unit is inactive during the period (the lag time) between the sending of the request and the reading of the second instruction line.

To reduce the lag time, the processing unit may be coupled to the bus via a device for prefetching the content of the non-volatile memory, the duration of the data exchange between the processing unit and said device being less than the lag time.

The prefetch device comprises a volatile memory whose access time is shorter than the access time to the non-volatile memory.

When the processing unit executes the instructions of the first instruction line, the prefetch device stores the second instruction line in the volatile memory.

In other words, the prefetch device stores in the volatile memory the instruction line identified by an address following the address of the instruction line being executed by the processing unit.

However, the instructions being executed by the processing unit may contain a line jump such that the next instruction line executed by the processing unit is not the one following the instruction line being executed (for example, the next instruction line executed by the processing unit is identified by an address designating the tenth line following the address of the instruction line being executed).

When the instruction line being executed has been executed, the processing unit sends a request to read the tenth instruction line to the non-volatile memory.

Storing an instruction line in the volatile memory consumes electrical power.

Since the instructions stored in the volatile memory are not executed, there is a loss of electrical power; furthermore, the processing unit is inactive during the lag time, thus reducing the volume of data processed by the processing unit in a given period.

There is a need to save the electrical energy consumed by the integrated circuit, while also reducing the period of inactivity of a processing unit of said circuit.

SUMMARY

Embodiments provide storing, in a volatile memory, an instruction line of a program following a first instruction line of the program being executed if the instructions of the first instruction line do not include any branch instruction.

According to various embodiments, a method comprises the storage, in a program memory, of instruction lines of a program to be executed by a processing unit, each line including at least one instruction, the storage, in memory means, of reference instructions that are interpretable by the processing unit as branch instructions, sequential requests by the processing unit for the various instruction lines, and, for a current line supplied in response to the corresponding request, (a) the determination, by means of the reference instructions, of whether or not at least one of the instructions of the current line is a branch instruction; and if at least one instruction is a branch instruction, (b) the execution, by the processing unit, of the instructions of the current line, before the processing unit sends a request for the next line.

Advantageously, if the current instruction line contains at least one branch instruction, no instruction line is stored in a volatile memory, thus enabling savings to be made in the amount of energy required for storage.

The branch instructions comprise, for example, line jump instructions, known by those skilled in the art under the English names of "jump" or "go to", which are interpretable by the processing unit.

For example, the memory means may comprise a non-volatile memory or a logic circuit enabling the reference instructions to be hard coded.

According to one embodiment, if no instruction of the current line is a branch instruction, the method comprises (c) the execution of the instructions of the current line by the processing unit, (d) the storage, in a first volatile memory, of the address of the next instruction line and (e) the storage, in a second volatile memory, of the instructions of the next instruction line contained in the program memory.

Advantageously, the method comprises, after the execution of steps (c), (d) and (e) at the time of the request by the processing unit for the next line, the supply of the next line on the basis of the contents of the first and second volatile memories, and, said next line becoming a new current line, a new execution of step (a) and step (b) or of steps (c) to (e).

Thus the processing unit reads the instructions of the next line directly from the second volatile memory, so that the lag time is shorter than in the case of reading from the program memory.

Advantageously, the period of inactivity of the processing unit is zero.

According to yet another embodiment, each of the instruction lines comprises four 32-bit instructions.

According to various embodiments, an integrated circuit comprises a processing unit, a program memory configured to store instruction lines of a program to be executed by the processing unit, each line including at least one instruction, memory means configured to store reference instructions that are interpretable by the processing unit as branch instructions, wherein the processing unit is configured to send requests for the different instruction lines sequentially, wherein the integrated circuit also comprises first comparison means configured to determine, using the reference instructions, whether or not at least one of the instructions of a current line supplied in response to the corresponding request is a branch instruction and if at least one instruction is a branch instruction, the processing unit is configured to execute the instructions of the current line before a request for the next line is sent.

According to one embodiment, the integrated circuit additionally comprises a first volatile memory configured to store the address of the next instruction line, a second volatile memory configured to store the instructions of the next line and control means configured so that, if no instruction of the current line is a branch instruction, they store the address of the next instruction line in the first volatile memory and they store the instructions of the next line in the second volatile memory. The processing unit is further configured so that it executes the instructions of the current line even if no instruction of the current line is a branch instruction.

According to another embodiment, the integrated circuit additionally comprises second comparison means configured so that, at the time of the request by the processing unit for the next line, they compare the address contained in said request and the address contained in the first volatile memory, a first multiplexer connected to the processing unit and configured for selecting the program memory or the second volatile memory and a second multiplexer connected to the first comparison means and configured for selecting the program memory or the second volatile memory. The control means is further configured for controlling the first and second multiplexers so that the content of the second volatile memory is accessible to the processing unit and to the first comparison means when the address stored in the first volatile memory and the address contained in said request are identical, or for controlling the first and second multiplexers so that the content of the program memory is accessible to the processing unit and to the first comparison means when the address stored in the first volatile memory and the address contained in said request are not identical.

According to another embodiment, the control means comprise a state machine.

According to yet another embodiment, each of the instruction lines comprises four 32-bit instructions.

According to another aspect, an apparatus incorporating an integrated circuit as defined above is proposed.

BRIEF DESCRIPTION OF THE DRAWINGS

Other advantages and characteristics of the invention will be apparent from a perusal of the detailed description of embodiments, which are not limiting in anyway, and of the appended drawings, in which:

FIG. 1 shows an embodiment of an integrated circuit incorporated in an electronic apparatus; and FIG. 2 shows an embodiment of a method to operate the integrated circuit.

DETAILED DESCRIPTION OF ILLUSTRATIVE EMBODIMENTS

Figure 1:
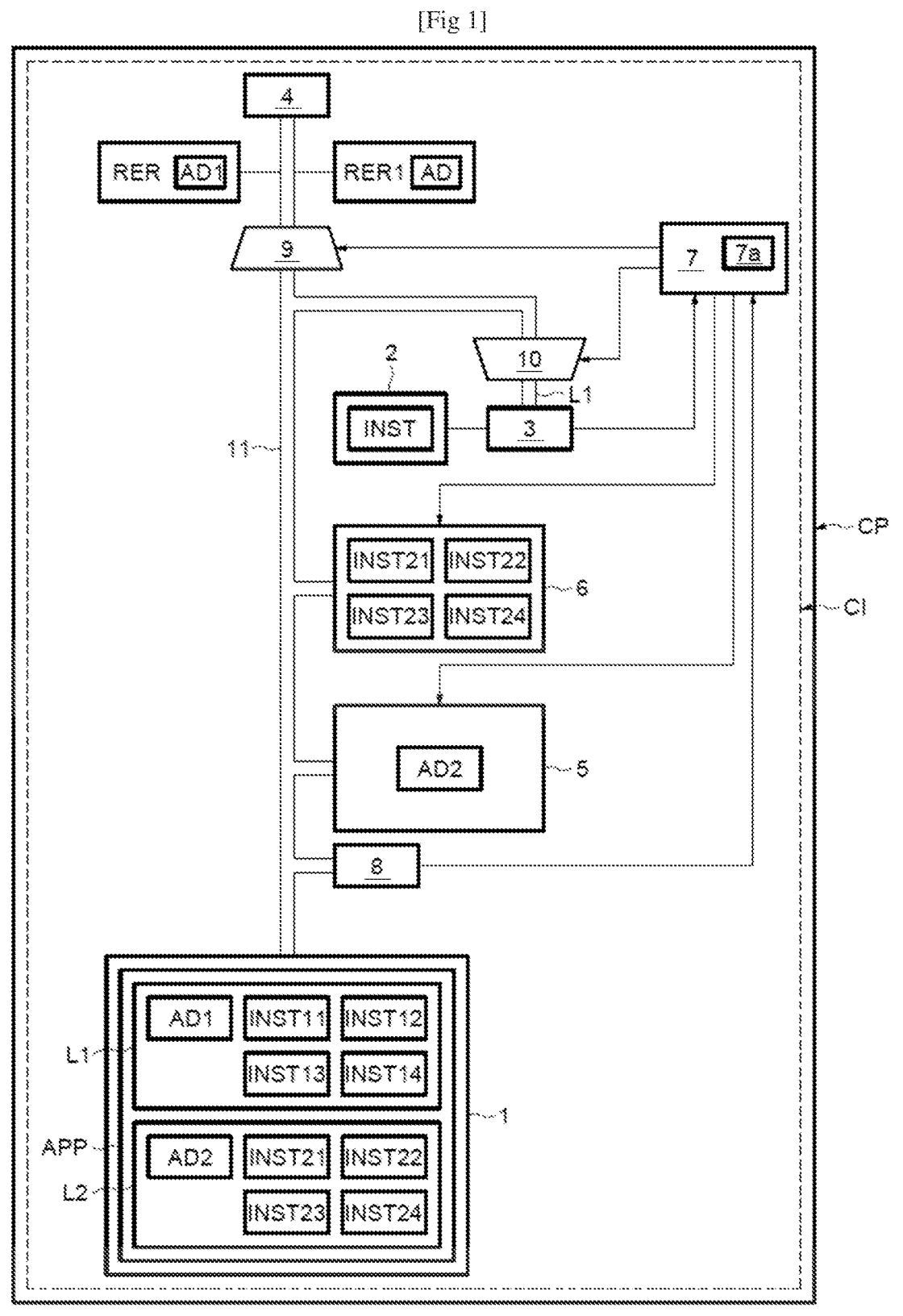

Reference will be made to FIG. 1, which shows an example of an embodiment of an integrated circuit CI incorporated in an electronic apparatus CP.

The integrated circuit CI comprises a processing unit 4 and a program memory 1 storing instruction lines L1 and L2 of a program APP to be executed by the processing unit 4.

The processing unit 4 is configured to send requests for the different instruction lines L1 and L2 sequentially.

Each line includes, for example, four instructions, each coded on 32 bits.

Evidently, the instruction lines of the program APP may comprise a different number of instructions coded on different numbers of bits, each line comprising at least one instruction.

The lines L1 and L2 are identified in the program memory 1 by the addresses AD1, AD2 and AD3 respectively, and contain the instructions INST11, INST12, INST13 and INST14, and INST21, INST22, INST23 and INST24, respectively.

Evidently, the program memory 1 could be outside the integrated circuit CI.

The integrated circuit CI additionally comprises memory means, in this case a non-volatile memory 2, which store reference instructions INST that are interpretable by the processing unit 4 as branch instructions and first comparison means 3 configured to determine, using the reference instructions, whether or not at least one of the instructions of a current line supplied in response to the corresponding request is a branch instruction.

For clarity of description, it is assumed in the following text that the instruction line L1 is the current line that is read after a request REQ comprising the address AD1 has been sent by the processing unit 4.

The processing unit 4 is configured to execute the instructions INST11, INST12, INST13 and INST14 of the current line L1 if at least one instruction INST11, INST12, INST13 and INST14 is a branch instruction, before a request REQ1 for the next line is sent.

The request REQ1 comprises the address AD of an instruction line.

The branch instructions comprise, for example, line jump instructions, known by those skilled in the art under the English names of "jump" or "go to", which are interpretable by the processing unit.

The integrated circuit CI further comprises a first volatile memory 5 configured to store the address AD2 of the instruction line L2 following the current line L1, a second volatile memory 6 configured to store the instructions INST21, INST22, INST23 and INST24 of the next line L2 and control means 7 configured for storing the address of the instruction line L2 in the first volatile memory 5 and storing the instructions INST21, INST22, INST23 and INST24 in the second volatile memory when no instruction INST11, INST22, INST23 and INST24 of the line L1 is a branch instruction INST.

The processing unit 4 is also configured to execute the instructions INST21, INST22, INST23 and INST24 of the line L2 if no instruction of the line L1 is a branch instruction.

The control means 7 comprise, for example, a state machine 7a.

The integrated circuit CI additionally comprises second comparison means 8 configured for comparing the address AD contained in the request REQ1 and the address contained in the first volatile memory 5.

The first and second comparison means 3 and 8 are constructed, for example, from logic gates and sequential logic elements.

The integrated circuit CI also comprises a first multiplexer 9 connected to the processing unit and configured for selecting the program memory 1 or the second volatile memory 6 and a second multiplexer 10 connected to the first comparison means 3 and configured for selecting the program memory 1 or the second volatile memory 6.

The control means 7 are also configured for controlling the first and second multiplexers 9 and 10 so that the content of the second volatile memory 6 is accessible to the processing unit 4 and to the first comparison means 3 when the address AD2 stored in the first volatile memory 5 and the address AD contained in the request REQ are identical.

The processing unit 4 then reads the instructions INST21, INST22, INST23 and INST24 of the second line L2 directly from the second volatile memory 6, so that the lag time is shorter than in the case of reading from the program memory 1.

Advantageously, the period of inactivity of the processing unit 4 is zero.

If the address AD2 stored in the first volatile memory 5 and the address AD contained in the request REQ are not identical, the control means 7 are configured for controlling the first and second multiplexers 9 and 10 so that the content of the program memory 1 is accessible to the processing unit 4 and to the first comparison means 3.

The processing unit 4 is connected to a bus n via the first multiplexer 9.

The program memory 1, the first and second volatile memories 5 and 6, and the second comparison means 8 are connected to the bus 11.

The first comparison means 3 are connected to the bus n via the second multiplexer 10.

Figure 2:
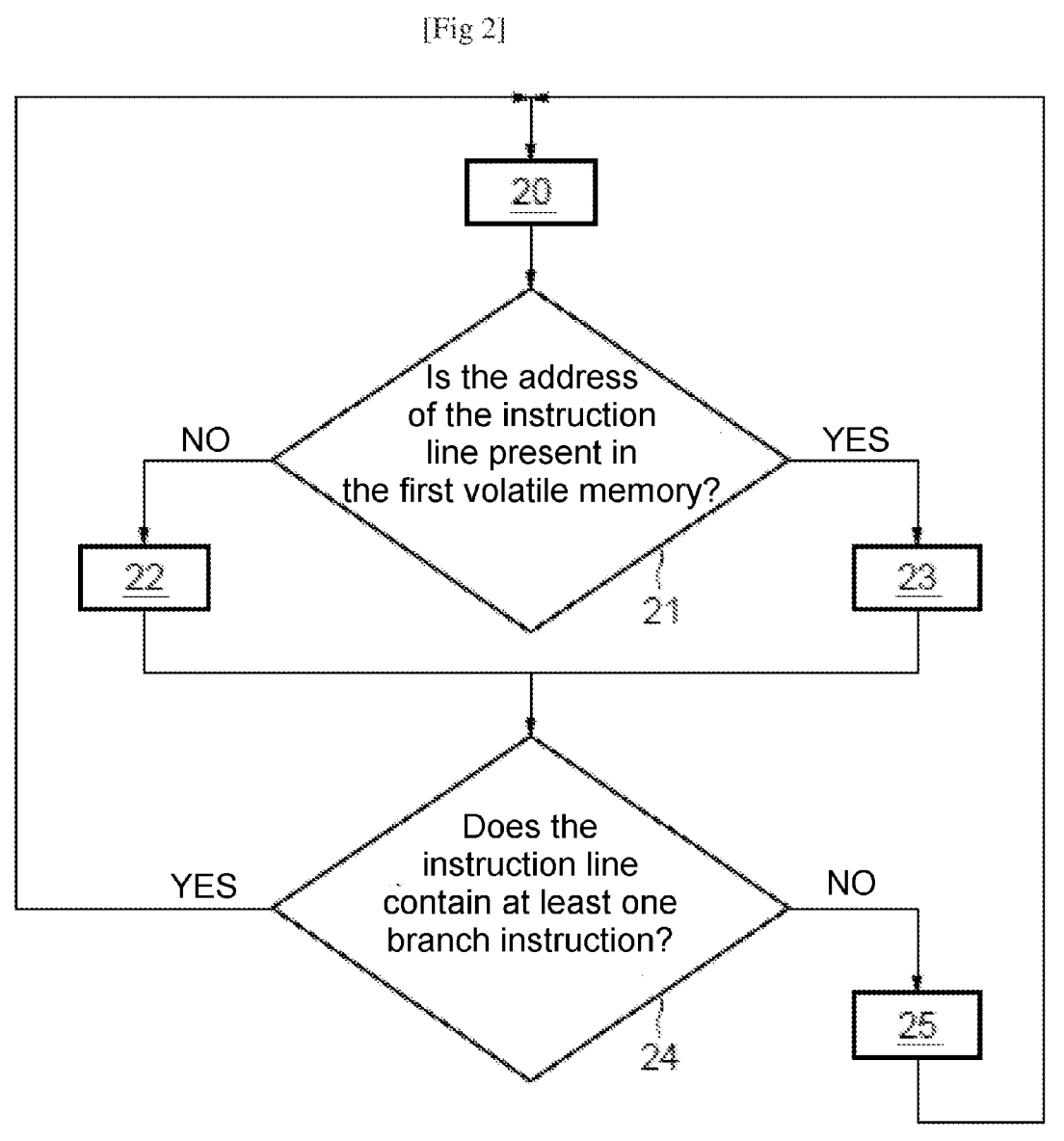

FIG. 2 shows an example of embodiment of the integrated circuit CI described above.

It is assumed that the first and second volatile memories 5 and 6 do not contain any addresses or instructions of the program APP.

In a first step 20, the processing unit 4 sends the request REQ on the bus 11, comprising the address AD1 of the first line L1.

Then, in a step 21, the second comparison means 8 compare the address AD1 with the content of the first volatile memory 5. The second comparison means 9 transmit the result of the comparison to the control means 7.

Since the address AD1 is not identical to the content of the first volatile memory 5, the control means 7 configure the first multiplexer 9 so that the processing unit 4 reads and executes the first instruction line L1 from the program memory 1, and configure the second multiplexer 10 so that the first comparison means 3 compare the instructions INST11, INST12, INST13 and INST14 of the line L1 with the instructions INST (step 22).

If the address AD1 is identical to the content of the first volatile memory 5, the control means 7 configure the first multiplexer 8 so that the processing unit 4 reads and executes the first instruction line L1 from the second volatile memory 6, and configure the second multiplexer 10 so that the first comparison means 3 compare the instructions INST11, INST12, INST13 and INST14 stored in the second volatile memory 6 with the instructions INST (step 23).

The first comparison means 3 transmit the result of the comparison to the means 7 (step 24).

If at least one of the instructions INST11, INST12, INST13 and INST14 contains one of the instructions INST, the method returns to step 20 and waits until the processing unit sends the next request REQ1.

If none of the instructions INST11, INST12, INST13 and INST14 contains any of the instructions INST, the control means 7 read the next line L2 from the program memory 1, store the address AD2 in the first volatile memory 5, and store the instructions INST21, INST22, INST23 et INST24 in the second volatile memory 6 (step 25). The processing unit 4 executes the line L1, and the method returns to step 20 and waits for the new request REQ1.

In the following text, it is assumed that none of the instructions INST11, INST12, INST13 and INST14 contains any of the instructions INST.

It is assumed that the address AD contained in the request REQ1 is the address AD2 of the second line L2.

When the new request REQ1 is sent (step 20), the second comparison means 8 compare the address AD with the address AD2 contained in the first volatile memory 5.

Since the address AD is identical to the address AD2 contained in the first volatile memory 5, the processing unit 4 reads and executes the instruction line L2 from the second volatile memory 6, and the first comparison means 3 compare the instructions INST21, INST22, INST23 and INST24 stored in the second volatile memory 6 with the instructions INST (step 23).

The method then continues in step 24 as described above.

What is claimed is:

1. An integrated circuit comprising:

a processor;

a program memory configured to store instruction lines of a program to be executed by the processor, each instruction line including at least one instruction;

a non-volatile memory configured to store reference instructions interpretable by the processor as branch instructions;

a first comparator configured to determine, using the reference instructions, whether or not at least one of the instructions of a current instruction line is a branch instruction;

a first volatile memory configured to store an address of a next instruction line;

a second volatile memory configured to store instructions of the next instruction line;

a controller;

a second comparator configured to compare an address contained in a request and the address contained in the first volatile memory;

a first multiplexer connected to the processor and configured to select the program memory or the second volatile memory;

a second multiplexer connected to the first comparator and configured to select the program memory or the second volatile memory; and a bus connecting the processor via the first multiplexer, to the program memory, the first and second volatile memories and the second comparator, and to the first comparator via the second multiplexer, wherein the processor is configured to send the request on the bus, the request comprising an address of a first instruction line, wherein the second comparator is configured to:

compare the address of the first instruction line with a content of the first volatile memory, and transmit a result of the comparison to the controller, wherein the controller is configured to:

in response to the address of the first instruction line being not identical to the content of the first volatile memory, configure the first multiplexer so that the processor reads and executes the first instruction line from the program memory, and configure the second multiplexer so that the first comparator compares instructions of the first instruction line with the reference instructions, in response to the address of the first instruction line being identical to the content of the first volatile memory, configure the first multiplexer so that the processor reads and executes the first instruction line from the second volatile memory, and configure the second multiplexer so that the first comparator compares the instructions of the first instruction line with the reference instructions, in response to determining that an instruction of the first instruction line comprises a reference instruction, wait until the processor sends the next request, and in response to determining that none of the instructions of the first instruction line comprises the reference instruction, read the next instruction line from the program memory, store the address of the next instruction line in the first volatile memory, and store instructions of the next instruction line in the second volatile memory.

2. The integrated circuit of claim 1, wherein the controller is a state machine.

3. The integrated circuit of claim 1, wherein each instruction line has four instructions of 32 bits each.

4. The integrated circuit of claim 1, wherein the processor is configured to execute all instructions of the first instruction line before sending the next request.

5. The integrated circuit of claim 1, wherein the first and second comparators comprise logic gates and sequential logic elements.

6. The integrated circuit of claim 1, wherein the program memory is a non-volatile memory external to the integrated circuit.

7. The integrated circuit of claim 1, wherein the bus connects the processor directly to the first multiplexer and from there directly to the program memory, the first and second volatile memories.

8. The integrated circuit of claim 7, wherein the bus connects the processor directly to the first multiplexer and from there directly to the second multiplexer and then directly to the first comparator.

9. The integrated circuit of claim 1, wherein the bus connects the processor directly to the first multiplexer and from there directly to the second multiplexer and then directly to the first comparator.

10. A method for operating an integrated circuit comprising a processor, a program memory for storing instruction lines of a program to be executed by the processor, each instruction line including at least one instruction, a non-volatile memory for storing reference instructions interpretable by the processor as branch instructions, a first comparator for determining, using the reference instructions, whether or not at least one of the instructions of a current instruction line is a branch instruction, a first volatile memory for storing an address of a next instruction line, a second volatile memory for storing instructions of the next instruction line, a controller, a second comparator for comparing an address contained in a request and the address contained in the first volatile memory, a first multiplexer connected to the processor and for selecting the program memory or the second volatile memory, a second multiplexer connected to the first comparator and for selecting the program memory or the second volatile memory and a bus connecting the processor via the first multiplexer, to the program memory, the first and second volatile memories and the second comparator, and to the first comparator via the second multiplexer, the method comprising:

sending, by the processor, the request on the bus, wherein the request comprises an address of a first instruction line;

comparing, by the second comparator, the address of the first instruction line with a content of the first volatile memory and transmitting a result of the comparison to the controller;

in response to the address of the first instruction line being not identical to the content of the first volatile memory, configuring, by the controller, the first multiplexer so that the processor reads and executes the first instruction line from the program memory, and configuring the second multiplexer so that the first comparator compares instructions of the first instruction line with the reference instructions;

in response to the address of the first instruction line being identical to the content of the first volatile memory, configuring the first multiplexer so that the processor reads and executes the first instruction line from the second volatile memory, and configuring the second multiplexer so that the first comparator compares the instructions of the first instruction line with the reference instructions;

in response to determining that an instruction of the first instruction line comprises a reference instruction, waiting until the processor sends the next request; and in response to determining that none of the instructions of the first instruction line comprises the reference instruction, read the next instruction line from the program memory, store the address of the next instruction line in the first volatile memory, and store instructions of the next instruction line in the second volatile memory.

11. The method of claim 10, wherein the controller is a state machine.

12. The method of claim 10, wherein each instruction line includes four instructions of 32 bits each.

13. The method of claim 10, wherein the method is performed in the cited order.

14. The method of claim 10, further comprising:

comparing, by the first comparator, the instruction of the first instruction line with the reference instruction of the non-volatile memory; and transmitting a result of the comparison to the controller.

15. An integrated circuit comprising:

a processor;

a program memory configured to store instruction lines of a program to be executed by the processor, each instruction line including at least one instruction;

a non-volatile memory configured to store reference instructions interpretable by the processor as branch instructions;

a first comparator configured to determine, using the reference instructions, whether or not at least one of the instructions of a current instruction line is a branch instruction;

a first volatile memory configured to store an address of a next instruction line;

a second volatile memory configured to store instructions of the next instruction line;

a controller;

a second comparator configured to compare an address contained in a request and the address contained in the first volatile memory;

a first multiplexer connected to the processor and configured to select the program memory or the second volatile memory;

a second multiplexer connected to the first comparator and configured to select the program memory or the second volatile memory; and a bus connecting the processor via the first multiplexer, to the program memory, the first and second volatile memories and the second comparator, and to the first comparator via the second multiplexer, wherein the processor is configured to send the request on the bus, the request comprising an address of a first instruction line, wherein the second comparator is configured to:

compare the address of the first instruction line with a content of the first volatile memory, and transmit a result of the comparison to the controller, wherein the controller is configured to:

in response to the address of the first instruction line being not identical to the content of the first volatile memory, configure the first multiplexer so that the processor reads and executes the first instruction line from the program memory, and configure the second multiplexer so that the first comparator compares instructions of the first instruction line with the reference instructions, in response to the address of the first instruction line being identical to the content of the first volatile memory, configure the first multiplexer so that the processor reads and executes the first instruction line from the second volatile memory, and configure the second multiplexer so that the first comparator compares the instructions of the first instruction line with the reference instructions, wherein the first comparator is configured to:

compare the instruction of the first instruction line with a reference instruction of the non-volatile memory, and transmit a result of the comparison to the controller, and wherein the controller is further configured to:

in response to determining that the instruction of the first instruction line comprises the reference instruction, wait until the processor sends the next request, and in response to determining that none of the instructions of the first instruction line comprises the reference instruction, read the next instruction line from the program memory, store the address of the next instruction line in the first volatile memory, and store instructions of the next instruction line in the second volatile memory.

16. The integrated circuit of claim 15, wherein the controller is a state machine.

17. The integrated circuit of claim 15, wherein the processor is configured to execute all instructions of the first instruction line before sending the next request.

18. The integrated circuit of claim 15, wherein the bus connects the processor directly to the first multiplexer and from there directly to the program memory, the first and second volatile memories.

19. The integrated circuit of claim 18, wherein the bus connects the processor directly to the first multiplexer and from there directly to the second multiplexer and then directly to the first comparator.

20. The integrated circuit of claim 19, wherein the non-volatile memory is directly connected to the first comparator.

* * * * *